United States Patent [19]

Abbotoy

[11] Patent Number: 4,813,173
[45] Date of Patent: Mar. 21, 1989

[54] FISHING LURE CONTAINER

[76] Inventor: Wilfred Abbotoy, 18 Ronald Dr., Lancaster, N.Y. 14086

[21] Appl. No.: 220,837

[22] Filed: Jul. 19, 1988

[51] Int. Cl.⁴ ............................................. A01K 97/06
[52] U.S. Cl. .................................. 43/57.1; 206/315.11; 206/533
[58] Field of Search ............... 43/57.1, 54.1; 206/538, 206/533, 315.11

[56] References Cited

U.S. PATENT DOCUMENTS

| | | | |
|---|---|---|---|
| 1,817,562 | 8/1931 | Hodge | 206/533 |
| 2,717,470 | 9/1955 | Holdeman | 206/315.11 |
| 2,734,306 | 2/1956 | Holdeman | 206/315.11 |
| 2,903,127 | 9/1956 | Dorman | 206/538 |
| 3,358,818 | 12/1967 | Davis | 206/538 |
| 4,164,301 | 8/1979 | Thayer | 206/538 |
| 4,261,468 | 4/1981 | Krebs | 206/538 |
| 4,288,006 | 9/1981 | Clover | 206/538 |

Primary Examiner—Gene P. Crosby
Attorney, Agent, or Firm—James J. Ralabate

[57] ABSTRACT

This is a fishing lure or crankbait container that has a substantially increased storage capacity. This container has the capability of storing very large as well as smaller lures. The transparent case has two compartments, an upper and a lower compartment. In each compartment is a single or double circle of transparent tubes. Each tube has an upper open end that forms the exit port for a lure. Planar caps are located on each end of the transparent container. Each cap has apertures which can be aligned with each tube for removing or inserting lures into the apertures.

11 Claims, 2 Drawing Sheets

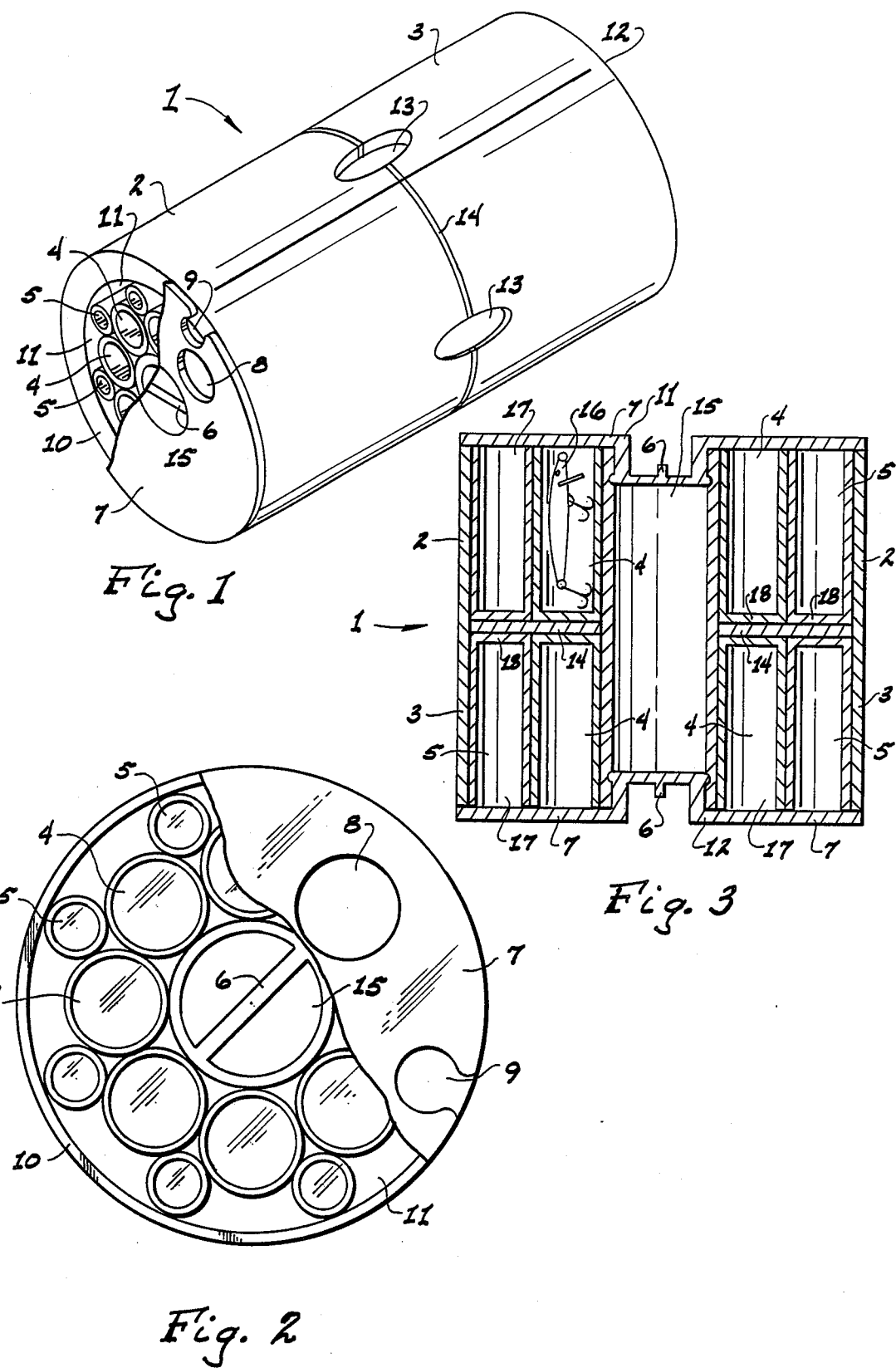

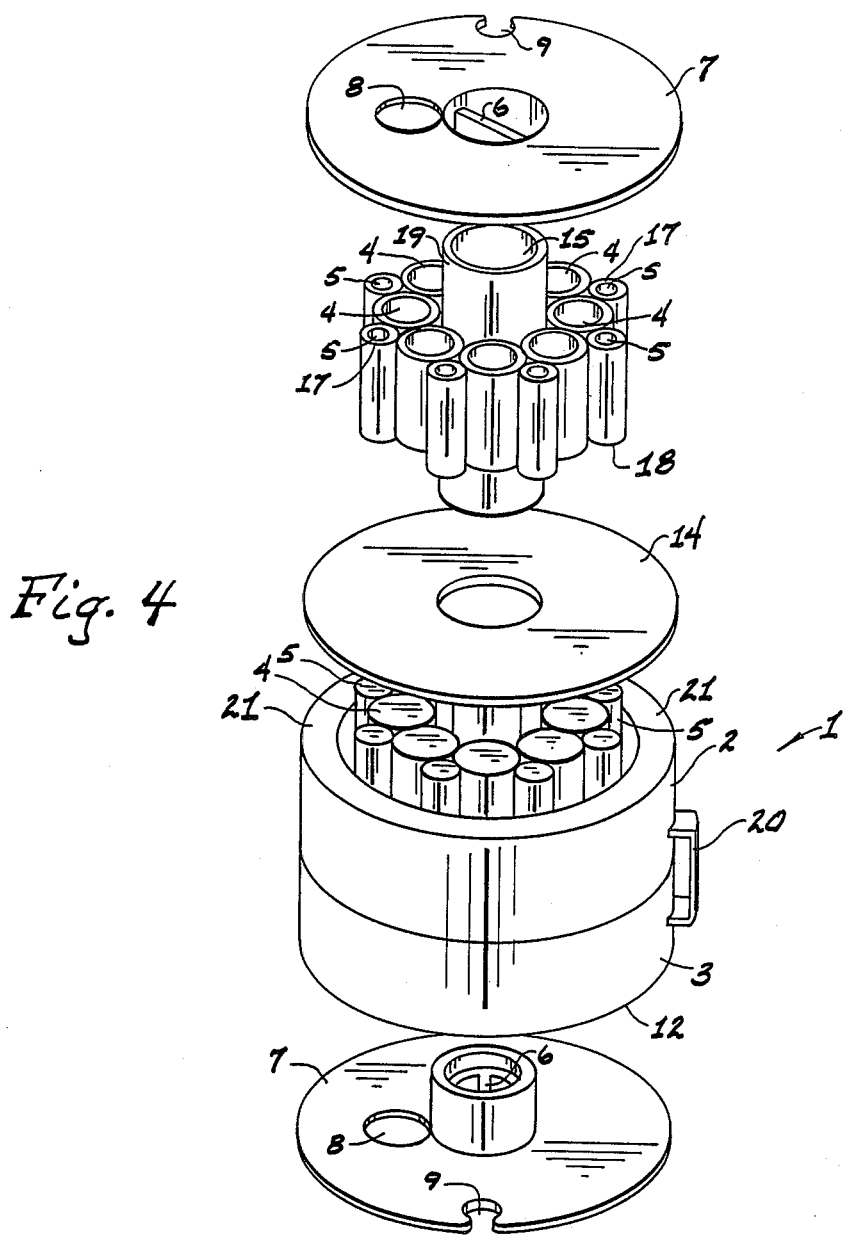
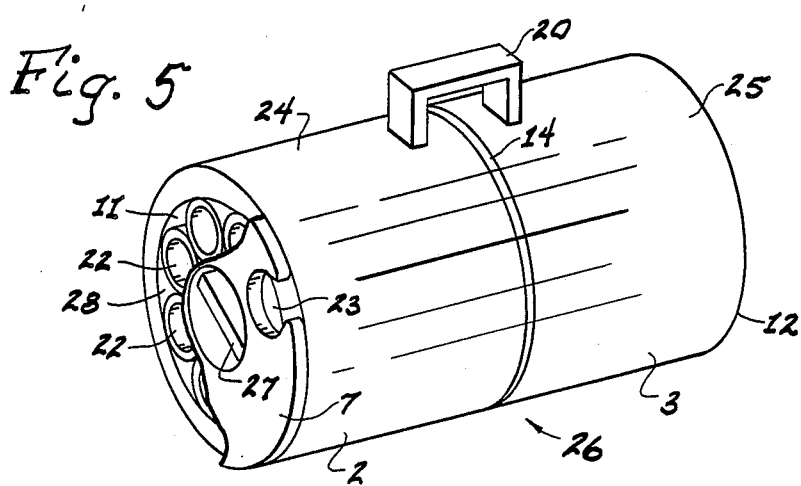

FISHING LURE CONTAINER

This invention relates to a container for keeping fishing lures and, more specifically, to a container having two separate compartments for housing a plurality of lure sections.

BACKGROUND OF THE INVENTION

There are available today several different type tackle boxes for housing various type lures used in fishing. In trolling, large lures called Magnums are frequently being used. This has created a problem since in most boxes there is at best minimum space to store these large lures in a conventional tackle box. Also, even in various types of fishing, lures have a tendency to become tangled and intertwined when piled one on the other in tackle boxes. Often, it is difficult to remove the desired lure and even more often to find the lure. Also, it can be very dangerous and cumbersome in rough waters to use containers where hooks and lures are all exposed and tangled. There is a present need for a lure container to hold large lures and to house lures, large or small that can be located easily and safely removed from the container. Most fishermen want a lure container that could hold many lures, that is easy to carry and one that will permit them to easily preselect a lure with a color appropriate for their present situation.

The container of the present invention, while particularly suitable for housing lures, may be used for any general purpose desired.

There are known several multicompartment dispensing and storage containers. Some of these multicompartment containers are disclosed in U.S. Pat. Nos. 1,817,562; 2,903,127; 3,358,818; 4,164,301; 4,261,468 and 4,288,006.

In U.S. Pat. No. 1,817,562 (Hodge) a compartment box is disclosed for use by fishermen. This box will hold dry flies and lures and permit easy access and viewing of lures. The top portion of Hodge's compartment box is a transparent disc and permits the fisherman to view the lures and remove them. The disc is turnable so that an opening in the disc is brought into registration with one of the compartments holding the desired lure. Hodge's compartments are V-shaped and only a limited amount of them can be fitted into the circular configuration. For example, in the compartment box described and illustrated by Hodge, only eight compartments are used. In order to provide more than eight compartments in Hodge's device either the compartments would be made smaller or the circular box would be made larger. In any event, the storage space in a Hodge-type box and the number of lures that could be contained therein would never be substantial. Today, with the usage of large type Magnum lures, a box such as Hodge's would be impractical. Also, with the multitude of lures required by the average fisherman, the Hodge-type device would be totally insufficient for today's needs.

In U.S. Pat. No. 2,903,127 (Dorman) a dispensing and storage container is disclosed. Dorman's device has a rotatable cover which has an aperture cooperating with the compartments for selectively dispensing the small articles therein. As shown in the drawings of Dorman, his compartments and cover are pie-shaped, thus allowing, as the cover is rotated, access to each compartment. Dorman's device as Hodges does not admit of a plurality of compartments. Dorman's is shown as having only six compartments, totally inappropriate for lure storage.

In Davis, U.S. Pat. No. 3,358,818, a pill dispenser having tubular compartments is disclosed. In Davis four and five compartmented devices are suggested. At the top portion of the Davis device is a stem which is connected to its selector top for turning the selector top. The selector top is a disc having an opening which, when aligned with one of the compartments, allows the insertion and removal of a pill or capsule from the tube. Since the pills have a substantially small volume, the Davis-type container is appropriate but would be totally inappropriate for lures and other relatively large objects. Also, as in the other prior art patents above discussed, the space is very limited in Davis' device, only 4-5 compartments and only 4-5 lures could be housed therein. A device that could house many more lures than 4-5 compartments would be desirable. Also, the stem used in the Davis device could be a very limiting factor in expanding a Davis device to accommodate more compartments since only one side could be used as the base.

In U.S. Pat. No. 4,164,301 (Thayer) as in Hodge and Dorman above discussed, a pie-shaped dispenser is disclosed. This dispenser has V-shaped compartments and a rotatable cover also having a V-shaped cutout for orientation and alignment with each compartment. The Thayer-like containers are all of limited capacity since only so many compartments can be fitted into a round pie-like configuration. Krebs, U.S. Pat. No. 4,261,468 discloses a similar dispenser to Thayer, both having V-shaped compartments in a round wheel-like structure. The spokes of this wheel-like structure define the compartments, and a rotatable top is used to gain access to each compartment. Both Thayer and Krebs have very limited capacity and would not be appropriate to house a plurality of lures or the like.

In Clover, U.S. Pat. No. 4,288,006, a tubular vitamin dispenser is disclosed. The tubular casing has V-shaped compartments therein which extend down-wardly to accommodate more vitamins. At the top of Clover's device is a cover plate rotatably mounted and having an access aperture. When the aperture is aligned with the V-shaped compartment, the vitamin can be removed for use. Here again, the limited number of compartments make Clover totally inappropriate for use as a lure container or dispenser.

SUMMARY OF THIS INVENTION

It is therefore an object of this invention to provide a lure container devoid of the above-noted disadvantages.

Another object of this invention is to provide a lure container and dispenser that has a large volume capacity and is easy to use.

Yet another object of this invention is to provide a lure container that permits visual observation of the contained lures with their wide variety of colors and easy immediate access to same.

Still another object of this invention is to provide a lure container that has at least double or more capacity than heretofore possible.

Still another object of this invention is to provide a lure container that permits fishermen to catagorize lures to type and color.

Another still further object of this invention is to provide a lure container that can house substantially any size lure including large trolling lures.

Another yet further object of this invention is to provide a lure container that permits removal of one lure while holding the others securely in place.

Still yet another object is to provide a lure container that is safe to use, easy to carry, easy to store and, most importantly, of a high storage capacity.

These and other objects are accomplished, generally speaking, by providing a lure container having a cylindrical case containing a plurality of removable, tubular compartments. To increase the storage capacity for lures, the cylindrical case has two separate compartments, an upper and lower. Each compartment contains several removable tubular compartments and all components are transparent so that each lure is easily visible and each tube in the same circle has substantially the same diameter. The top and bottom of the case have rotating caps with one or two openings therein for permitting access to each tubular compartment. In lieu of a rotating cap with openings, one could have an individual cap on each tube. The cap can be a plastic transparent cap movably positioned on each tube opening with a snapshut feature to hold it in a closed position when desired. This individual cap feature is considered to be an alternative to the preferred embodiment of a rotating cap covering all of the tube openings.

The lure is then removed by tilting the case to allow the lure to fall out or, in lieu thereof, merely by removing the tubular compartment and taking the lure therefrom. It is extremely important to this invention that each cap, both the bottom and top caps, be planar or flat without projections to permit either to be used as the base when placed upon a flat surface. The cylindrical case has an annular divider or a washer-type divider that separates the upper from the lower compartments. In the preferred embodiment, when viewed from the top, each compartment contains at least two rows of tubes, an inner row and an outer row, both positioned in a circular manner each parallel with each other and with the periphery of the case. In the centermost portion formed by the circular configuration of the tubes is a tubular chamber or casing into which the recessed handle or turnpiece is seated. Also, if desirable, a flotation means can be positioned therein to provide an unsinkable container. The turnhandle is used to rotate the cap, both lower and upper compartment, to align the apertures in each cap with the tube opening. Rather than a cylindrical case, any other suitable configuration can be used such as rectangular, octagonal, triangular, etc. But it is highly desirable and preferred to use a cylindrical case. All of the components of the lure container are made preferably from clear plastics such as polyurethanes, polycarbonates, polystyrenes, polyethylenes, methylmethacrylates and other appropriate polymers. While plastics are strongly preferred, other suitable materials obviously may be used. The top and bottom caps preferably have two openings or selector apertures in each for registering with the openings in each tube for selectively removing the desired lure. The purpose of two openings or apertures in each cap is to permit alignment or registration with two circular rows of tubes in each compartment. Thus, the container of this invention preferably has at least two rows or circles of tubes in the upper compartment and at least two rows of tubes in the lower compartment. Using one row of tubes in the lower and one row of tubes in the upper compartment would also be within the spirit and scope of this invention. Also, while it is preferred that each tube be removable, if suitable, a user could have each tube fixed in place in the container. The container of this invention provides access at either end (i.e. top or bottom of container) to either the upper or lower compartments. Since all components are easily accessible, the container of this invention is easy to assemble and manufacture, at a relatively low cost.

DESCRIPTION OF THE DRAWINGS

FIG. 1 is a perspective side view of the container of this invention.

FIG. 2 is a top plan view of the container of this invention showing the preferred tube arrangement.

FIG. 3 is a side plan view of the container of this invention.

FIG. 4 is an exploded perspective view of the container of this invention illustrating the components of the container.

FIG. 5 is another embodiment of the tube arrangement for the container of this invention.

DESCRIPTION OF DRAWINGS AND PREFERRED EMBODIMENTS

In FIG. 1 the preferred tube arrangement is shown for lure container 1. Lure container 1 is transparent in order to permit the fisherman to view the lures for type and/or color, and select the one he wishes to remove from the container. Container 1 has two separate and distinct compartments, upper compartment 2 and lower compartment 3. Each compartment is preferred to be substantially identical to the other and contains the same number of tubes 4 and 5. However, if desirable, one compartment can have more or can have larger tubes or smaller tubes to help distinguish various size lures. Tubes 4 and 5 are also transparent to further permit observation of the lures for style or type and very important color in each tube. In this preferred embodiment, the tubes 4 and 5 are arranged in a double circle configuration with tubes 4 the inner circle tubes and tubes 5 the outer circle tubes. This double circle configuration permits an increased capacity for the lure container 1. Thus, it is easy to fit 16 or more tubes in the upper compartment 2 and also 16 or more tubes in lower compartment 3. In the centermost portion is a turning means 6 adapted to rotate cap 7 so as to align exit apertures 8 and 9 with the appropriate tube so that the lure contained therein may be removed. Cap 7 is also transparent and is rotatable 360° along the peripheral portion 10 of the container case 1. The cap 7 is flat in order that either end portion 11 of upper compartment 2 or end portion 12 of lower compartment 3 can be layed flat upon a level surface. Any obstructing protrusions on either end surface 11 or 12 will prevent the proper use of the lure container 1. This is because of the double compartment structure where compartments 2 and 3 need to be usable when in the upright condition. The cap 7 is identical for both end portions 11 and 12 and will permit access to all of the tubes in the respective compartments. The exit apertures 8 and 9 are so structured that when one is aligned with a tube in the inner or outer circle, all the other tubes are blocked off to prevent any lure from falling out or the apertures can both be covered with a hinged cap or loose cap. Thus, the cap 7 on end portion 11 acts as the container base or floor when end portion 12 is upward and end portion 12 acts as the base or floor when end portion 11 is upward. A finger hole 13 (or a handle 20 as shown in FIGS. 4 and 5) may be used for ease of handling or carrying lure container 1. Tubes 4 and 5 have open ends on their ends facing end portions 11 and 12 and adjacent exit apertures and 9 to permit insertion or removal of lures therein. While it is preferred that apertures 8 and 9 are open as shown, they may have caps or closures on them if desirable. The container case 1 is divided into compartments 2 and 3 by a divider disc 14 which has a substantially flat washer-like structure. The tube ends abutting and resting on divider disc 14 are close ended to support any lure housed therein. Tubes 4 and 5 can be removable or fixed upon divider 14, if desired. A feature of the present transparent lure container 1 is that it can house substantially large lures and the very large capacity and accessibility of lures housable therein.

In FIG. 2 a top view of the preferred embodiment is illustrated. In this structure, the preferred double row or double circle configuration is used. This provides substantially increased capacity while at the same time permitting easy access. Tubes 5 in the outer circle or row will house lures accessible through exit aperture 9 while the lures housed in tubes 4 will be accessible from aperture 8. Since the cap 7 and all other components of container 1 are transparent, all tubes can be viewed from outside the container. Therefore, when the desired color and style lure is located, cap 7 is rotated until either aperture 8 or 9 is over the desired lure and tube. The lure then is removed from the tube through either aperture 8 or 9. Cap 7 is rotated by merely turning cap handle or turnpiece 6 until the aperture 8 or 9 is in registration or alignment with the tube opening of the tube holding the lure desired. Since the centermost portion 15 is hollow or empty, a flotation means can be inserted therein to render container 1 unsinkable. This could be a valuable feature when the container containing very valuable lures accidentally falls overboard; it will float rather than sink. The tube arrangement shown in FIG. 2 is preferred to be the same for both compartments 2 and 3, however, if desirable for any reason, the tube arrangements can vary in each compartment.

FIG. 3 shows a side view of the two compartments, upper compartment 2 and lower compartment 3. Each transparent compartment 2 and 3 contains transparent tubes 4 and 5 which can house a lure 16 that is easily visible from outside container 1. Caps 7 (one at a time) are turned until the aperture 8 or 9 is over the desired lure and tube opening so it can be removed. It is critical that caps 7 must be flat so that the container can rest evenly and not tip or fall because of a protruding obstruction. Turnpiece 6 is recessed so as not to extend beyond the outer plane of cap 7 and cause an obstruction when end 11 or 12 is used as the base. The center core portion 15 is preferably filled with flotation means such as polyurethane foams or other known flotation devices to render the container 1 floatable. Divider 14 is located approximately halfway dow container 1 and is the divider which forms the two separate compartments 2 and 3. Divider 14 is washer-like in its structure and therefore has a hole in the center forming with the inner core of container 1 a cylindrical core section 15 which extends from cap 7 in upper end 11 to cap 7 in lower end 12. Tubes 4 and 5 have an open end at their portions 17 adjacent caps 7 and are closed at their end portions 18 adjacent to divider 14.

FIG. 4 is an exploded view showing the components of the container 1 of this invention. Caps 7 are shown on top and bottom ends of container 1 having a recessed turnpiece 6 for rotating cap 7 to align either aperture 8 with tubes 4 or aperture 9 with tubes 5. In the center core portion is a cylinder 19 which forms a core section 15 into which a flotation means can be housed. Circling cylinder 19 are two rows of tubes, inner tubes 4 and outer row tubes 5. A divider 14 forms the two mirror image compartments, upper compartment 2 and lower compartment 3. The tubes 4 and 5 are preferably closed at their locations 18 which rest and abut on divider 14. Tube ends 17 adjacent caps 7 are open to allow access to lures 16 housed therein. A soft handle 20 or other carrying means may be used to permit carrying container 1 from one location to another. The container 1 has a main cylindrical case 21 which houses all the other components of the container 1 and also forms with divider 14 upper and lower compartments 2 and 3. The inner circumference of case 21 is of a dimension to have outer tubes 5 fit snuggly therein. Tubes 4, of course, fit inside tubes 5 in a circular alignment.

FIG. 5 illustrates a second embodiment of the invention wherein a single roll of tubes 22 is used rather than the double roll or circle of tubes 4 and 5 as in the preferred embodiment. When a single circle of tubes 22 is used only one exit aperture 23 is required. A more limited storage capacity is provided by this embodiment wherein upper compartment 24 and lower compartment 25 have a single row of tubes 22 or at least one compartment has a single row of tubes 22 while the other can have the preferred structure as shown in FIGS. 1 and 2 and 4. It is critical, however, to this invention that a two-compartmented container be used having an upper compartment 2 and a lower compartment 3. Also critical to this invention is that cap 7 outer surfaces be even or flat so that either end 11 or 12 may be used as the base and could properly rest evenly upon a supporting structure. A soft handle means 20 may be used for easy carrying of container 26. Turnpiece 27 is used to rotate cap 28 and align aperture 23 with the desired tube 22. As earlier noted, the double compartment feature 24 and 25 and the flat caps 7 on either end are critical to the present invention and all embodiments must contain these features plus the preferred flotation housing means as shown in this embodiment at 28. The flat caps 7 are needed so that either end can be used as the floor or base.

In any event, the embodiments of FIGS. 1, 2 and 4 are definitely preferred because of the substantially increased capacity they provide.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A fishing lure container comprising a transparent cylindrical case, said case having positioned in its inner portion approximately halfway down its height, a washer-like divider having opposite faces which extends substantially parallel to the top and bottom surfaces of said cylindrical case to form thereby an upper and lower compartment, positioned in each compartment are a plurality of transparent tubes each at their base portion resting on or contacting one of the opposite faces of said divider and positioned in a circular configuration at the upper end of each tube opposite the base portion, said tubes are open to provide an opening and housing therein, a planar rotatable cap portion on each end of said cylindrical case adjacent said upper ends of the tubes and forming thereby a planar surface on both ends of said cylindrical case, at least one aperture in each of said rotatable caps that will align with one tube opening when rotated to that position, said tubes being located about a chamber that extends through the center portion of said divider into the next adjacent compartment.

2. The container of claim 1 wherein at least two circles of tubes are positioned in each of said compartments.

3. The container of claim 1 wherein said planar caps have in their center portions a turnpiece having means to rotate said caps until said aperture is aligned with an opening of a desired tube.

4. The container of claim 1 wherein said chamber is in a cylindrical configuration substantially parallel with said case and located at the inner peripheral portion of said tubes.

5. The container of claim 1 wherein at least two circles of tubes are positioned in each of said compartments and each of said caps has at least two apertures having means to become aligned with at least one tube in each compartment.

6. The container of claim 1 wherein each tube of a given circle of tubes has substantially the same diameter as the other tubes in said circle.

7. A lure dispenser comprising: an outer two-compartmented cylindrical transparent case, tubular means in each compartment of said case defining a series of juxtaposed transparent tubular housings each having an open and closed end, abovesaid tubes are planar selector caps rotatably mounted on an upper and lower side of said case, said caps having selector apertures, said caps also having means to manually rotate said selector caps, said selector apertures alignable with the open end of each tube, two rows or circles of tubes located in each compartment, each tube extending downwardly in contact with a divider, said divider forming said two compartments in said case, said case having a handle means for transporting said case.

8. The container of claim 7 wherein said planar caps have in their center portions a turnpiece having means to rotate said caps until said aperture is aligned with an opening of a desired tube.

9. The container of claim 7 wherein a chamber is in a cylindrical configuration substantially parallel with said case and located at the inner peripheral portion of said tubes.

10. The container of claim 7 wherein each of said caps has at least two apertures having means to become aligned with at least one tube in each compartment.

11. The container of claim 7 wherein each tube of a given circle of tubes has substantially the same diameter as the other tubes in said circle.

* * * * *